(12) United States Patent
Baker et al.

(10) Patent No.: US 12,043,418 B2
(45) Date of Patent: Jul. 23, 2024

(54) EXTENSIBLE HABITAT PRESSURE CONTROL FOR PLANETARY AND ORBITAL SPACE VEHICLES

(71) Applicant: B/E AEROSPACE, INC., Winston Salem, NC (US)

(72) Inventors: Bryce Baker, Raymore, MO (US); Cory Kaufman, Saint Louis, MO (US); John Terence Barker, Overland Park, KS (US); Samuel Anderson, Houston, TX (US)

(73) Assignee: B/E AEROSPACE, INC., Winston Salem, NC (US)

( * ) Notice: Subject to any disclaimer, the term of this patent is extended or adjusted under 35 U.S.C. 154(b) by 521 days.

(21) Appl. No.: 17/392,994

(22) Filed: Aug. 3, 2021

(65) Prior Publication Data
US 2023/0042564 A1    Feb. 9, 2023

(51) Int. Cl.
*B64G 1/48*        (2006.01)
*G05D 16/20*     (2006.01)

(52) U.S. Cl.
CPC ............ *B64G 1/48* (2013.01); *G05D 16/204* (2013.01)

(58) Field of Classification Search
CPC ........ B64G 1/48; G05D 16/204; B64D 13/02; B64D 13/04
See application file for complete search history.

(56) References Cited

U.S. PATENT DOCUMENTS

| | | | |
|---|---|---|---|
| 3,215,057 A * | 11/1965 | Turek ............... | A61M 16/1015 454/70 |
| 4,651,728 A | 3/1987 | Gupta et al. | |
| 7,784,462 B2 | 8/2010 | Vogt et al. | |
| 2010/0051751 A1 | 3/2010 | Mueller et al. | |
| 2019/0023426 A1 | 1/2019 | Gray et al. | |
| 2019/0023428 A1* | 1/2019 | Veselka ............... | B64G 1/60 |

FOREIGN PATENT DOCUMENTS

| CN | 108458251 A * | 8/2018 | ............... F17D 1/02 |
|---|---|---|---|
| CN | 111377066 | 7/2020 | |
| CN | 111377067 A * | 7/2020 | |

OTHER PUBLICATIONS

Advantages and Disadvantages to Solenoid Valves, Sep. 30, 2019, MGA Controls, p. 2 https://www.mgacontrols.com/advantages-and-disadvantages-to-solenoid-valves/ (Year: 2019).*
European Patent Office, European Search Report dated Dec. 23, 2022 in Application No. 22187323.5.

* cited by examiner

Primary Examiner — Edelmira Bosques
Assistant Examiner — Michael James Giordano
(74) Attorney, Agent, or Firm — SNELL & WILMER L.L.P.

(57) ABSTRACT

An environmental control system for a space vehicle includes an oxygen supply, a nitrogen supply, a first pressure control panel having a first oxygen control board configured to receive an oxygen gas from the oxygen supply and a first nitrogen control board configured to receive a nitrogen gas from the nitrogen supply, and a supervisory controller configured to control the first pressure control panel and thereby to adjust a partial pressure of oxygen and an ambient pressure of an oxygen/nitrogen gas mixture within a first module.

10 Claims, 3 Drawing Sheets

EXTENSIBLE HABITAT PRESSURE CONTROL FOR PLANETARY AND ORBITAL SPACE VEHICLES

FIELD

The present disclosure relates generally to planetary and orbital space vehicles and, more particularly, to habitat or environmental control systems that may be scaled to specific requirements of planetary and orbital space vehicles, as well as related equipment, such as pressurized garments and the like used outside of planetary and orbital space vehicles.

BACKGROUND

Planetary and orbital space vehicles require an environment or habitat controlled and configured for breathing by the occupants of such vehicles. For example, the partial pressure levels of oxygen and nitrogen in the various compartments or modules of such vehicles may be controlled to emulate the levels typically found at sea level on Earth. Further, discreet compartments or modules within such vehicles—e.g., unoccupied compartments or modules—may require lower levels of oxygen or nitrogen depending on the intended use or nonuse of the compartment or module at any particular time. For example, the environment within an airlock chamber or a crew lock chamber typically requires a deviation from sea level conditions when an astronaut is preparing for a spacewalk. Localized pressure control panels positioned within discreet compartments or modules are beneficial in providing a localized and convenient means of controlling the partial pressure levels of oxygen and nitrogen and the ambient pressure within such discreet compartments or modules.

SUMMARY

An environmental control system for a space vehicle is disclosed. In various embodiments, the environmental control system includes an oxygen supply; a nitrogen supply; a first pressure control panel having a first oxygen control board configured to receive an oxygen gas from the oxygen supply and a first nitrogen control board configured to receive a nitrogen gas from the nitrogen supply; and a supervisory controller configured to control the first pressure control panel and thereby to adjust a partial pressure of oxygen and an ambient pressure of an oxygen/nitrogen gas mixture within a first module.

In various embodiments, the environmental control system further includes an oxygen high-pressure regulator disposed between the oxygen supply and the first oxygen control board, the oxygen high-pressure regulator configured to reduce a high-pressure oxygen gas to a low-pressure oxygen gas. In various embodiments, the environmental control system further includes a nitrogen high-pressure regulator disposed between the nitrogen supply and the first nitrogen control board, the nitrogen high-pressure regulator configured to reduce a high-pressure nitrogen gas to a low-pressure nitrogen gas.

In various embodiments, the first oxygen control board includes an oxygen pressure transducer configured to determine an oxygen pressure within the first oxygen control board. In various embodiments, the first oxygen control board includes an oxygen solenoid valve configured to regulate and to release the oxygen gas into the first module.

In various embodiments, the first nitrogen control board includes a nitrogen pressure transducer configured to determine a nitrogen pressure within the first nitrogen control board. In various embodiments, the first nitrogen control board includes a nitrogen solenoid valve configured to regulate and to release the nitrogen gas into the first module.

In various embodiments, the environmental control system further includes an oxygen sensor configured to measure the partial pressure of oxygen within the first module. In various embodiments, the first oxygen control board is configured to release the oxygen gas into the first module when the partial pressure of oxygen within the first module is below an oxygen pressure threshold value. In various embodiments, the first oxygen control board is configured to stop release of the oxygen gas into the first module when the partial pressure of oxygen within the first module is above the oxygen pressure threshold value.

In various embodiments, the environmental control system further includes an ambient pressure sensor configured to measure the ambient pressure within the first module. In various embodiments, the first nitrogen control board is configured to release the nitrogen gas into the first module when the ambient pressure is below an ambient pressure threshold value and the partial pressure of oxygen within the first module is above the oxygen pressure threshold value. In various embodiments, the first nitrogen control board is configured to stop release of the nitrogen gas into the first module when the ambient pressure is above the ambient pressure threshold value and the partial pressure of oxygen within the first module is above the oxygen pressure threshold value. In various embodiments, the first pressure control panel includes a pressure relief solenoid valve configured to exhaust at least a portion of the oxygen/nitrogen gas mixture from the first module if the ambient pressure exceeds the ambient pressure threshold value.

In various embodiments, the environmental control system further includes a second pressure control panel having a second oxygen control board configured to receive the oxygen gas from the oxygen supply and a second nitrogen control board configured to receive the nitrogen gas from the nitrogen supply. In various embodiments, the supervisory controller is configured to control the second pressure control panel and thereby to adjust the partial pressure of oxygen and the ambient pressure of the oxygen/nitrogen gas mixture within a second module. In various embodiments, the second pressure control panel can provide environmental control redundancy to the first pressure control panel when the modules are not isolated from one another.

A space vehicle is disclosed. In various embodiments, the space vehicle includes a first module; a second module; an oxygen supply; a nitrogen supply; a first pressure control panel within the first module, the first pressure control panel having a first oxygen control board configured to receive an oxygen gas from the oxygen supply and a first nitrogen control board configured to receive a nitrogen gas from the nitrogen supply; a second pressure control panel within the second module, the second pressure control panel having a second oxygen control board configured to receive the oxygen gas from the oxygen supply and a second nitrogen control board configured to receive the nitrogen gas from the nitrogen supply; and a supervisory controller configured to control the first pressure control panel and thereby to adjust a first partial pressure of oxygen and a first ambient pressure of a first oxygen/nitrogen gas mixture within the first module and to control the second pressure control panel and thereby to adjust a second partial pressure of oxygen and a second ambient pressure of a second oxygen/nitrogen gas mixture within the second module.

In various embodiments, the first oxygen control board includes an oxygen pressure transducer configured to determine an oxygen pressure within the first oxygen control board and an oxygen solenoid valve configured to regulate and to release the oxygen gas into the first module. In various embodiments, the first nitrogen control board includes a nitrogen pressure transducer configured to determine a nitrogen pressure within the first nitrogen control board and a nitrogen solenoid valve configured to regulate and to release the nitrogen gas into the first module.

In various embodiments, the space vehicle further includes a first oxygen sensor configured to measure the first partial pressure of oxygen within the first module and the first oxygen control board is configured to release the oxygen gas into the first module when the first partial pressure of oxygen within the first module is below an oxygen pressure threshold value and to stop release of the oxygen gas into the first module when the first partial pressure of oxygen within the first module is above the oxygen pressure threshold value.

In various embodiments, the space vehicle further includes an ambient pressure sensor configured to measure the first ambient pressure within the first module. In various embodiments, the first nitrogen control board is configured to release the nitrogen gas into the first module when the first ambient pressure is below an ambient pressure threshold value and the first partial pressure of oxygen within the first module is above the oxygen pressure threshold value. In various embodiments, the first nitrogen control board is configured to stop release of the nitrogen gas into the first module when the first ambient pressure is above the ambient pressure threshold value and the first partial pressure of oxygen within the first module is above the oxygen pressure threshold value. In various embodiments, the first pressure control panel includes a pressure relief solenoid valve configured to exhaust at least a portion of the first oxygen/nitrogen gas mixture from the first module if the first ambient pressure exceeds the ambient pressure threshold value.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
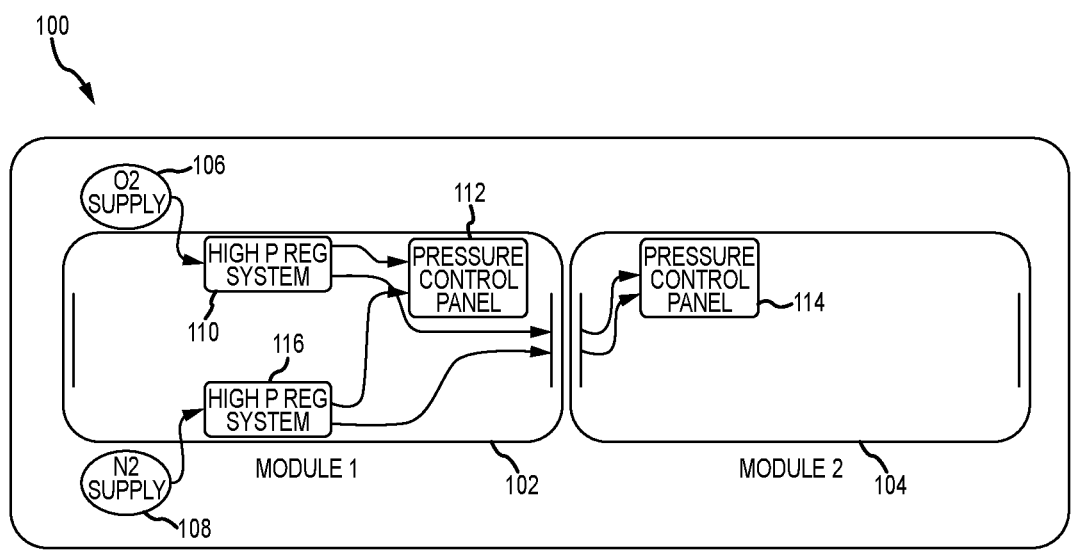
FIG. 1 provides a schematic view of a pair of modules having environmental control systems within a planetary or orbital space vehicle, in accordance with various embodiments.

Referring now to the drawings, FIG. 1 schematically illustrates a space vehicle 100 (e.g., a planetary or orbital space vehicle) having a first module 102 and a second module 104. The space vehicle 100 includes an oxygen supply 106 and a nitrogen supply 108, each of which may comprise a high-pressure tank or a gas generator configured to generate oxygen or nitrogen at high-pressure (e.g., on the order of about 500 psi (≈3,450 KPa) to about 4,000 psi (≈27,600 KPa)). The oxygen supply 106 may be configured to provide the oxygen gas ($O_2$) to an oxygen high-pressure regulator 110, which may be configured to reduce the pressure of the oxygen gas to a low-pressure (e.g., on the order of thirty pounds per square inch (30 psi or ≈200 KPa)). The low-pressure oxygen gas is then delivered to a first pressure control panel 112, which is configured to control the partial pressure of oxygen within the habitat or environment of the first module 102, and to a second pressure control panel 114, which is configured to control the partial pressure of oxygen within the habitat or environment of the second module 104. Similarly, the nitrogen supply 108 may be configured to provide the nitrogen gas ($N_2$) to a nitrogen high-pressure regulator 116, which may be configured to reduce the pressure of the nitrogen gas to a low-pressure. The low-pressure nitrogen gas is then delivered to the first pressure control panel 112, which is configured to control the partial pressure of nitrogen within the habitat or environment of the first module 102, and to the second pressure control panel 114, which is configured to control the partial pressure of nitrogen within the habitat or environment of the second module 104. In various embodiments, the first pressure control panel 112 and the second pressure control panel 114 are configured to control the partial pressure of oxygen from about twenty percent (20%) to about twenty-one percent (21%) and the partial pressure of nitrogen from about seventy-nine (79%) to about eighty percent (80%) of the oxygen/nitrogen gas mixture at an absolute pressure of about 14.7 psi (≈100 KPa), which emulates the oxygen/nitrogen partial pressure levels at sea-level on Earth.

Figure 2:
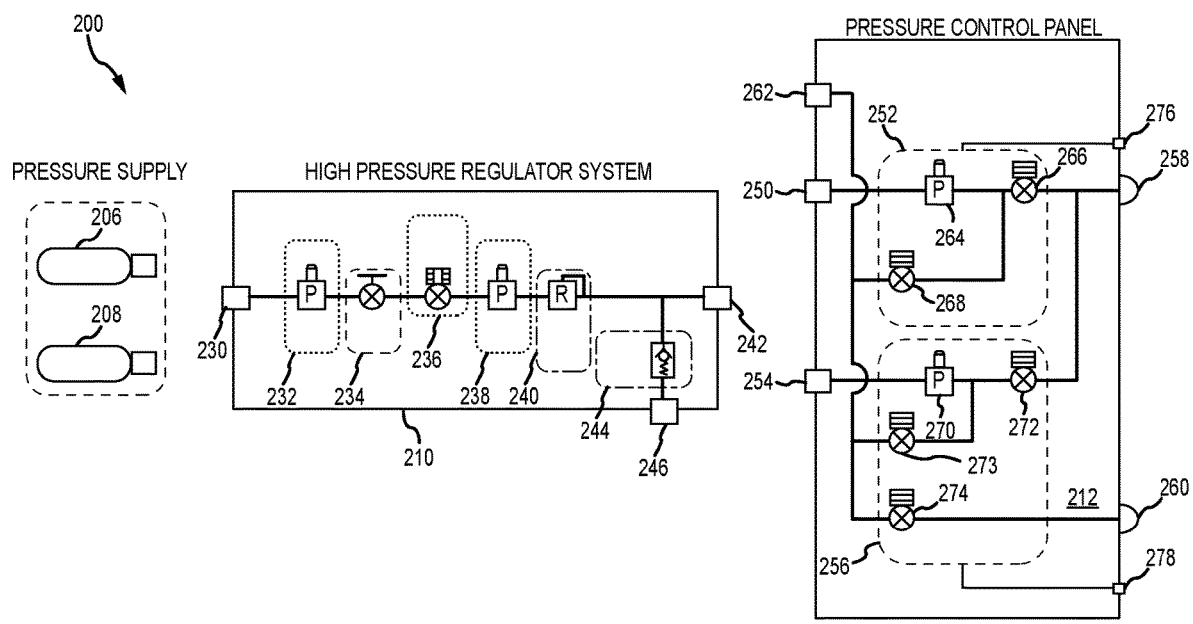
FIG. 2 provides a schematic view of an environmental control system for a planetary or orbital space vehicle, in accordance with various embodiments.

Referring now to FIG. 2, a schematic view of an environmental control system 200 for a planetary or orbital space vehicle is provided, in accordance with various embodiments. The environmental control system 200 includes an oxygen supply 206 and a nitrogen supply 208, each of which may comprise a high-pressure tank or a gas generator configured to generate oxygen or nitrogen at high-pressure. The oxygen supply 206 may be configured to provide the oxygen gas to an oxygen high-pressure regulator 210, which may be configured to reduce the pressure of the oxygen gas to a low-pressure; the nitrogen supply 208 may be configured to provide the nitrogen gas to a nitrogen high-pressure regulator, which, in various embodiments, has components identical or nearly identical to those of the oxygen high-pressure regulator 210. The low-pressure oxygen gas and the low-pressure nitrogen gas are then delivered to a pressure control panel 212, similar to the first pressure control panel 112 and the second pressure control panel 114 described above with reference to FIG. 1, which is configured to control the partial pressure of oxygen and the partial pressure of nitrogen within a module or compartment, such as, for example, the first module 102 or the second module 104 described above with reference to FIG. 1. In various embodiments, the pressure control panel 212 is configured to control the partial pressure of oxygen from about twenty percent (20%) to about twenty-one percent (21%) and the partial pressure of nitrogen from about seventy-nine (79%) to about eighty percent (80%) of the oxygen/nitrogen gas mixture at an absolute pressure of about 14.7 psi (≈100 KPa), which emulates the oxygen/nitrogen partial pressure levels at sea-level on Earth.

Still referring to FIG. 2, and in various embodiments, the oxygen high-pressure regulator 210 includes a high-pressure input 230, a first pressure transducer 232, a manual shutoff valve 234, an electronic control valve 236 (e.g., a stepper motor or solenoid), a second pressure transducer 238, a low-pressure regulator 240 and a low-pressure oxygen output 242. During operation, high-pressure oxygen gas from the oxygen supply 206 is provided to the high-pressure input 230 and subsequently provided to the electronic control valve 236 and the low-pressure regulator 240, which regulates the pressure and flow rate of the oxygen gas provided by the oxygen supply 206. In various embodiments, the electronic control valve 236 is responsive to the pressure of the oxygen gas provided by the oxygen supply 206 as determined by the first pressure transducer 232. The oxygen gas is then provided to the low-pressure regulator 240, which reduces the pressure of the oxygen gas downstream of the electronic control valve 236 to a lower pressure. The low-pressure oxygen gas is then provided to the pressure control panel 212 via the low-pressure oxygen output 242. In the event the low-pressure regulator 240 fails to regulate the pressure of the oxygen gas to a target low pressure or below, a relief valve 244 is disposed between the low-pressure regulator 240 and the low-pressure oxygen output 242 and configured to exhaust such an overpressure to an exterior of the space vehicle via a vacuum relief port 246. Further, in the event of an emergency or required maintenance, the manual shutoff valve 234 is configured to shutoff the supply of oxygen gas from the oxygen supply 206. Note that as used in this disclosure, a pressure regulator is a system or device configured to reduce pressure of a gas from a high-pressure value to a low-pressure value, with the low-pressure value being less than the high-pressure value. For example, in various embodiments, the high-pressure regulators described herein are configured to reduce the pressure of the oxygen or nitrogen gas streams from a high-pressure value (e.g., 3,000 psi (≈20,700 KPa)) to a low-pressure value (e.g., 30 psi (≈200 KPa)), while the low-pressure oxygen and nitrogen solenoids are controlled to maintain the pressure of the oxygen or nitrogen gas streams from the low-pressure value (e.g., 30 psi (≈200 KPa)) to an habitable-pressure value (e.g., 14.7 psi (≈100 KPa) with 21% Oxygen and 79% Nitrogen. Further, as described, the pressure regulators typically comprise a valve that is biased by a spring or the like or open and closed by a servomotor or the like. Finally, as mentioned above, the nitrogen high-pressure regulator includes components identical or nearly identical to the components comprised within the oxygen high-pressure regulator 210, so such components within the nitrogen high-pressure regulator are not described in further detail.

Still referring to FIG. 2, the low-pressure oxygen output 242 is coupled to and provides the oxygen gas to a low-pressure oxygen input 250 of the pressure control panel 212. The oxygen gas is then provided to an oxygen control board 252 within the pressure control panel 212. An oxygen pressure transducer 264 is configured to sense the pressure of the oxygen gas (or an oxygen pressure) entering the oxygen control board 252. A first oxygen solenoid valve 266 is then configured to open or close at a rate based on the pressure of the oxygen gas and the partial pressure of oxygen within the compartment of module. More particularly, an oxygen sensor 276 is configured to measure the partial pressure of oxygen within the compartment or module. If the partial pressure of oxygen within the compartment or module is lower than an oxygen pressure threshold value, the first oxygen solenoid valve 266 is opened, allowing the oxygen gas to flow to the compartment or module via a vent 258 until the oxygen pressure threshold value is reached; note the vent 258 may also act as a diffuser configured to mix the oxygen and nitrogen gas streams exiting the vent 258. On the other hand, if the partial pressure of oxygen within the compartment or module is equal to or higher than the oxygen pressure threshold value, the first oxygen solenoid valve 266 is closed, preventing the oxygen gas from flowing to the compartment or module via the vent 258. In various embodiments, the oxygen control board 252 further includes a second oxygen solenoid valve 268 configured to vent the oxygen gas via a vacuum exhaust 262 in the event of an overpressure within the oxygen control board 252, with the vacuum exhaust typically opening to an exterior area of the space vehicle.

Similarly, the low-pressure nitrogen output is coupled to and provides the nitrogen gas to a low-pressure nitrogen input 254 of the pressure control panel 212. The nitrogen gas is then provided to a nitrogen control board 256 within the pressure control panel 212. A nitrogen pressure transducer 270 is configured to sense the pressure of the nitrogen gas (or a nitrogen pressure) entering the nitrogen control board 256. A first nitrogen solenoid valve 272 is then configured to open or close at a rate based on the pressure of the nitrogen gas and the partial pressure of oxygen within the compartment of module. More particularly, the oxygen sensor 276 is configured to measure the partial pressure of oxygen within the compartment or module. If the partial pressure of oxygen within the compartment or module is higher than the oxygen pressure threshold value and the ambient pressure is below the ambient pressure threshold (or the partial pressure of nitrogen is below a nitrogen pressure threshold value), the first nitrogen solenoid valve 272 is opened, allowing the nitrogen gas to flow to the compartment or module via the vent 258 until the ambient pressure threshold value is reached. On the other hand, if the ambient pressure of the compartment or module is equal to or higher than the ambient pressure threshold value, the first nitrogen solenoid valve 272 is closed, preventing the nitrogen gas from flowing to the compartment or module via the vent 258. In various embodiments, the nitrogen control board 256 further includes a second nitrogen solenoid valve 273 configured to vent the nitrogen gas via the vacuum exhaust 262 in the event of an overpressure within the nitrogen control board 256. Note that in various embodiments, the pressure control panel 212 includes an ambient pressure sensor 278 configured to sense the ambient pressure within the compartment or module. If the ambient pressure exceeds the ambient pressure threshold value (e.g., 14.7 psi or 100 KPa), a pressure relief solenoid valve 274 is opened, allowing the oxygen/nitrogen gas mixture within the compartment or module to be exhausted from an exhaust intake 260 and through the vacuum exhaust 262.

Figure 3:
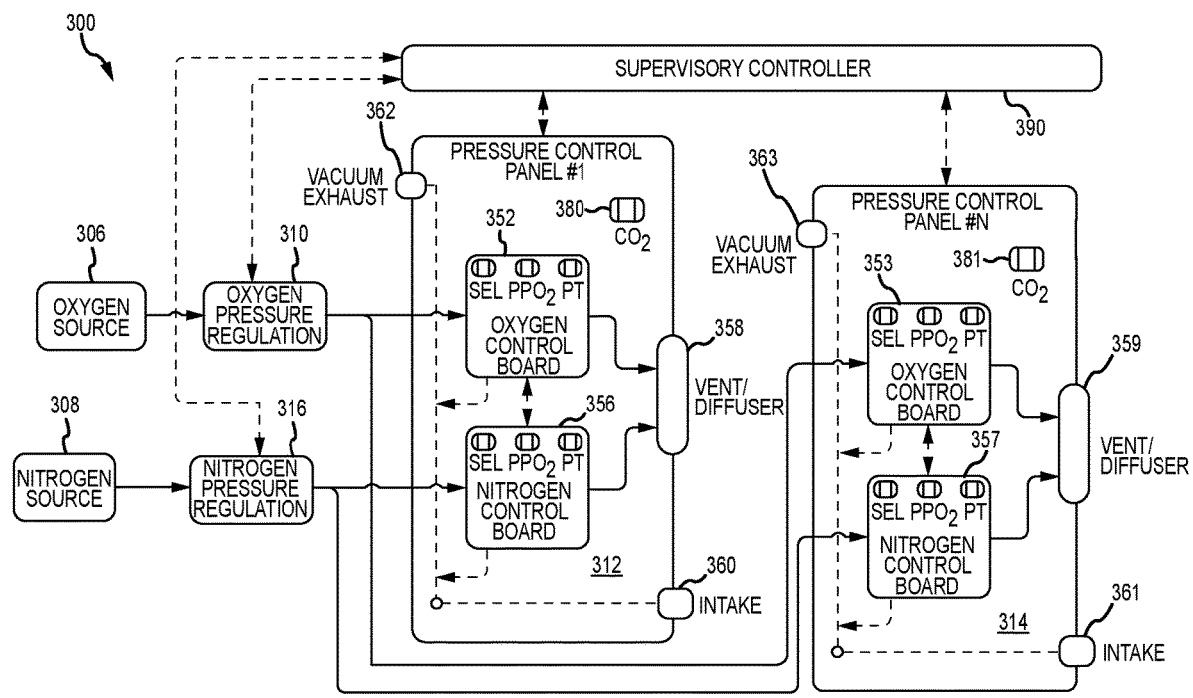
FIG. 3 provides a schematic view of an environmental control system for a planetary or orbital space vehicle, in accordance with various embodiments.

Referring now to FIG. 3, a schematic view of an environmental control system 300 for a planetary or orbital space vehicle is provided, in accordance with various embodiments. The environmental control system 300, which is similar to the environmental control system 200 described above, includes an oxygen supply 306 and a nitrogen supply 308, each of which may comprise a high-pressure tank or a gas generator configured to generate oxygen or nitrogen at high-pressure. The oxygen supply 306 is configured to provide the oxygen gas to an oxygen high-pressure regulator 310, which is configured to reduce the pressure of the oxygen gas to a low-pressure. Similarly, the nitrogen supply 308 is configured to provide the nitrogen gas to a nitrogen high-pressure regulator 316, which, in various embodiments, has components identical or nearly identical to those of the oxygen high-pressure regulator 310 (and to the oxygen high-pressure regulator 210 described above). The low-pressure oxygen gas and the low-pressure nitrogen gas are then delivered to a first pressure control panel 312 and to an Nth pressure control panel 314 (e.g., a second pressure control panel, a third pressure control panel, etc.), with N equaling the number of control panels disposed throughout the various compartments or modules within the space vehicle. Similar to the pressure control panel 212 described above, the first pressure control panel 312 and the Nth pressure control panel 314 are configured to control the partial pressure of oxygen from about twenty percent (20%) to about twenty-one percent (21%) and the partial pressure of nitrogen from about seventy-nine (79%) to about eighty percent (80%) of the oxygen/nitrogen gas mixture at an absolute pressure of about 14.7 psi (≈100 KPa), which emulates the oxygen/nitrogen partial pressure levels at sea-level on Earth.

Similar to the environmental control system 200 described above, during operation, a high-pressure oxygen gas from the oxygen supply 306 is provided to the oxygen high-pressure regulator 310, which reduces the pressure of the oxygen gas. The oxygen gas is then provided to a first oxygen control board 352 located within the first pressure control panel 312 and to an Nth oxygen control board 353 (e.g., a second oxygen control board, a third oxygen control board, etc.) located within the Nth pressure control panel 314, as well as to any pressure control panels intermediate the first and the Nth pressure control panels. In similar fashion, a high-pressure nitrogen gas from the nitrogen supply 308 is provided to the nitrogen high-pressure regulator 316, which reduces the pressure of the nitrogen gas. The nitrogen gas is then provided to a first nitrogen control board 356 located within the first pressure control panel 312 and to an Nth nitrogen control board 357 (e.g., a second nitrogen control board, a third nitrogen control board, etc.) located within the Nth pressure control panel 314 (as well as to any pressure control panels intermediate the first and the Nth pressure control panels). In various embodiments, each of the first oxygen control board 352 and the Nth oxygen control board 353 and the first nitrogen control board 356 and the Nth nitrogen control board 357 are coupled to an oxygen sensor ($PPO_2$) configured to measure the partial pressure of oxygen and an ambient pressure sensor within a corresponding compartment or module. In various embodiments, each of the oxygen and nitrogen control boards also include a pressure transducer (PT) (e.g., the oxygen pressure transducer 264 or the nitrogen pressure transducer 270 described above) and a function selector (SEL) configured for inputting control functions (e.g., whether the control board is a nitrogen control board or an oxygen control board within the corresponding compartment or module). In various embodiments, the first pressure control panel 312 includes a first carbon dioxide sensor 380 and the Nth pressure control panel 314 an Nth carbon dioxide sensor 381, each of which is configured to detect the level of carbon dioxide in the corresponding compartment or module.

Still referring to FIG. 3, the environmental control system 300 includes a supervisory controller 390 configured to control operation of the system. The supervisory controller 390, as illustrated, is coupled to the first pressure control panel 312 and the Nth pressure control panel 314 and to the various components comprising the first pressure control panel 312 and the Nth pressure control panel 314. The supervisory controller 390 is also coupled to the oxygen high-pressure regulator 310 and to the nitrogen high-pressure regulator 316. During operation, the supervisory controller 390 receives inputs from the various sensors (e.g., the oxygen sensors, the ambient pressure sensors and the carbon dioxide sensors) and the function selectors. In response, the supervisory controller 390 controls operation of the high-pressure regulators and the pressure control panels. For example, the supervisory controller 390 controls the flow of oxygen gas and nitrogen gas out of a first vent 358 associated with the first pressure control panel 312 and the flow of oxygen gas and nitrogen gas out of an Nth vent 359 associated with the Nth pressure control panel 314 in response to signals received from the oxygen sensors, the ambient pressure sensors, and the carbon dioxide sensors corresponding to each of the control panels. Similarly, the supervisory controller 390 is configured to control the exhaust of ambient air from a first exhaust intake 360 and through a first vacuum exhaust 362 associated with the first pressure control panel 312 and from an Nth exhaust intake 361 and through an Nth vacuum exhaust 363 associated with the Nth pressure control panel 314. The supervisory controller is also configured to control operation of the various oxygen, nitrogen and pressure relief solenoid valves comprised within the various control panels. The supervisory controller 390 may be connected to the pressure regulation systems and the pressure control panels by physical wire or by wireless communication. In addition to controlling operation of the environmental control system 300, the supervisory controller 390 may be configured to broadcast status and warnings to a control console and to mission control. The supervisory controller 390 may also be responsible for running prognostic health maintenance on the high-pressure regulation systems, the pressure control panels and even itself, including when a new pressure control panel is added to the environmental control system 300. In various embodiments, the supervisory controller 390 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof.

Various benefits of the foregoing disclosure may be realized. For example, the environmental control systems described above may be deployed on different types of space vehicles using modular components. This allows design of custom, integrated, lightweight, and scalable environment or habitat pressure control systems to be designed into space vehicles without incurring design or redesign expenses associated with custom designs that are specific to each type of space vehicle. The use of modular components also minimizes the number and different types of spare parts required to be stored on the space vehicles. Redundancy is also readily built into the environmental control system (e.g., into the pressure control panels) that enables pressure control to continue operation until repairs may be made.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An environmental control system for a space vehicle, comprising:
    an oxygen supply;
    a nitrogen supply;
    a first pressure control panel having a first oxygen control board configured to receive an oxygen gas from the oxygen supply and a first nitrogen control board configured to receive a nitrogen gas from the nitrogen supply; and
    a supervisory controller configured to control the first pressure control panel and thereby to adjust a partial pressure of oxygen and an ambient pressure of an oxygen/nitrogen gas mixture within a first module; and an oxygen sensor configured to measure the partial pressure of oxygen within the first module, wherein:

the first oxygen control board includes an oxygen pressure transducer configured to determine an oxygen pressure within the first oxygen control board, the first oxygen control board includes an oxygen solenoid valve configured to regulate and to release the oxygen gas into the first module, the first nitrogen control board includes a nitrogen pressure transducer configured to determine a nitrogen pressure within the first nitrogen control board, the first nitrogen control board includes a nitrogen solenoid valve configured to regulate and to release the nitrogen gas into the first module, the first oxygen control board is configured to release the oxygen gas into the first module when the partial pressure of oxygen within the first module is below an oxygen pressure threshold value, and the first oxygen control board is configured to stop release of the oxygen gas into the first module when the partial pressure of oxygen within the first module is above the oxygen pressure threshold value.

2. The environmental control system of claim 1, further comprising an oxygen high-pressure regulator disposed between the oxygen supply and the first oxygen control board, the oxygen high-pressure regulator configured to reduce a high-pressure oxygen gas to a low-pressure oxygen gas.

3. The environmental control system of claim 2, further comprising a nitrogen high-pressure regulator disposed between the nitrogen supply and the first nitrogen control board, the nitrogen high-pressure regulator configured to reduce a high-pressure nitrogen gas to a low-pressure nitrogen gas.

4. The environmental control system of claim 1, further comprising an ambient pressure sensor configured to measure the ambient pressure within the first module, wherein the first nitrogen control board is configured to release the nitrogen gas into the first module when the ambient pressure is below an ambient pressure threshold value and the partial pressure of oxygen within the first module is above the oxygen pressure threshold value, and wherein the first nitrogen control board is configured to stop release of the nitrogen gas into the first module when the ambient pressure is above the ambient pressure threshold value and the partial pressure of oxygen within the first module is above the oxygen pressure threshold value.

5. The environmental control system of claim 4, wherein the first pressure control panel includes a pressure relief solenoid valve configured to exhaust at least a portion of the oxygen/nitrogen gas mixture from the first module if the ambient pressure exceeds the ambient pressure threshold value.

6. The environmental control system of claim 5, further comprising a second pressure control panel having a second oxygen control board configured to receive the oxygen gas from the oxygen supply and a second nitrogen control board configured to receive the nitrogen gas from the nitrogen supply.

7. The environmental control system of claim 6, wherein the supervisory controller is configured to control the second pressure control panel and thereby to adjust the partial pressure of oxygen and the ambient pressure of the oxygen/nitrogen gas mixture within a second module.

8. A space vehicle, comprising:
a first module;
a second module;
an oxygen supply;
a nitrogen supply;
a first pressure control panel within the first module, the first pressure control panel having a first oxygen control board configured to receive an oxygen gas from the oxygen supply and a first nitrogen control board configured to receive a nitrogen gas from the nitrogen supply;

a second pressure control panel within the second module, the second pressure control panel having a second oxygen control board configured to receive the oxygen gas from the oxygen supply and a second nitrogen control board configured to receive the nitrogen gas from the nitrogen supply; and a supervisory controller configured to control the first pressure control panel and thereby to adjust a first partial pressure of oxygen and a first ambient pressure of a first oxygen/nitrogen gas mixture within the first module and to control the second pressure control panel and thereby to adjust a second partial pressure of oxygen and a second ambient pressure of a second oxygen/nitrogen gas mixture within the second module; and a first oxygen sensor configured to measure the first partial pressure of oxygen within the first module, wherein:

the first oxygen control board includes an oxygen pressure transducer configured to determine an oxygen pressure within the first oxygen control board and an oxygen solenoid valve configured to regulate and to release the oxygen gas into the first module, the first nitrogen control board includes a nitrogen pressure transducer configured to determine a nitrogen pressure within the first nitrogen control board and a nitrogen solenoid valve configured to regulate and to release the nitrogen gas into the first module, and the first oxygen control board is configured to release the oxygen gas into the first module when the first partial pressure of oxygen within the first module is below an oxygen pressure threshold value and to stop release of the oxygen gas into the first module when the first partial pressure of oxygen within the first module is above the oxygen pressure threshold value.

9. The space vehicle of claim 8, further comprising an ambient pressure sensor configured to measure the first ambient pressure within the first module, wherein the first nitrogen control board is configured to release the nitrogen gas into the first module when the first ambient pressure is below an ambient pressure threshold value and the first partial pressure of oxygen within the first module is above the oxygen pressure threshold value and wherein the first nitrogen control board is configured to stop release of the nitrogen gas into the first module when the first ambient pressure is above the ambient pressure threshold value and the first partial pressure of oxygen within the first module is above the oxygen pressure threshold value.

10. The space vehicle of claim 9, wherein the first pressure control panel includes a pressure relief solenoid valve configured to exhaust at least a portion of the first oxygen/nitrogen gas mixture from the first module if the first ambient pressure exceeds the ambient pressure threshold value.

* * * * *